United States Patent
Ishii et al.

(10) Patent No.: US 9,031,485 B2
(45) Date of Patent: May 12, 2015

(54) FIXING DEVICE AND ENDLESS BELT ASSEMBLY

(71) Applicants: Kenji Ishii, Kanagawa (JP); Masahiko Satoh, Tokyo (JP); Masaaki Yoshikawa, Tokyo (JP); Hiroshi Yoshinaga, Chiba (JP); Takeshi Uchitani, Kanagawa (JP); Tadashi Ogawa, Tokyo (JP); Hiromasa Takagi, Tokyo (JP); Naoki Iwaya, Tokyo (JP); Takuya Seshita, Kanagawa (JP); Takahiro Imada, Kanagawa (JP); Hajime Gotoh, Kanagawa (JP); Takamasa Hase, Shizuoka (JP); Kazuya Saito, Kanagawa (JP); Toshihiko Shimokawa, Kanagawa (JP); Shuutaroh Yuasa, Kanagawa (JP); Teppei Kawata, Kanagawa (JP); Arinobu Yoshiura, Kanagawa (JP); Akira Suzuki, Tokyo (JP)

(72) Inventors: Kenji Ishii, Kanagawa (JP); Masahiko Satoh, Tokyo (JP); Masaaki Yoshikawa, Tokyo (JP); Hiroshi Yoshinaga, Chiba (JP); Takeshi Uchitani, Kanagawa (JP); Tadashi Ogawa, Tokyo (JP); Hiromasa Takagi, Tokyo (JP); Naoki Iwaya, Tokyo (JP); Takuya Seshita, Kanagawa (JP); Takahiro Imada, Kanagawa (JP); Hajime Gotoh, Kanagawa (JP); Takamasa Hase, Shizuoka (JP); Kazuya Saito, Kanagawa (JP); Toshihiko Shimokawa, Kanagawa (JP); Shuutaroh Yuasa, Kanagawa (JP); Teppei Kawata, Kanagawa (JP); Arinobu Yoshiura, Kanagawa (JP); Akira Suzuki, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 20 days.

(21) Appl. No.: 13/746,691

(22) Filed: Jan. 22, 2013

(65) Prior Publication Data
US 2013/0189008 A1      Jul. 25, 2013

(30) Foreign Application Priority Data
Jan. 24, 2012    (JP) ................................ 2012-011854

(51) Int. Cl.
*G03G 15/20*       (2006.01)
*B65G 45/02*       (2006.01)

(52) U.S. Cl.
CPC ............ *G03G 15/2025* (2013.01); *B65G 45/02* (2013.01); *G03G 15/2053* (2013.01); *G03G 2215/2035* (2013.01)

(58) Field of Classification Search
CPC .......... G03G 15/2025; G03G 15/2053; G03G 2215/2035; B65G 45/06; B65G 45/02
USPC .......................... 399/320, 328, 329, 302, 308
See application file for complete search history.

(56) References Cited

U.S. PATENT DOCUMENTS

| | | | |
|---|---|---|---|
| 5,525,775 A * | 6/1996 | Setoriyama et al. | 219/216 |
| 2005/0147436 A1* | 7/2005 | Koyama et al. | 399/329 |
| 2006/0029411 A1 | 2/2006 | Ishii et al. | |
| 2007/0212089 A1 | 9/2007 | Seo et al. | |
| 2007/0242988 A1 | 10/2007 | Seo et al. | |
| 2007/0280754 A1 | 12/2007 | Ogawa et al. | |
| 2007/0292175 A1 | 12/2007 | Shinshi | |
| 2008/0025772 A1 | 1/2008 | Seo et al. | |
| 2008/0025773 A1 | 1/2008 | Ito et al. | |
| 2008/0219721 A1 | 9/2008 | Ito et al. | |
| 2008/0226326 A1 | 9/2008 | Seo et al. | |
| 2008/0232873 A1 | 9/2008 | Ueno et al. | |
| 2009/0123201 A1 | 5/2009 | Ehara et al. | |
| 2009/0148205 A1 | 6/2009 | Seo et al. | |
| 2009/0245865 A1 | 10/2009 | Shinshi et al. | |
| 2009/0245897 A1 | 10/2009 | Seo et al. | |
| 2009/0297197 A1 | 12/2009 | Hase | |
| 2010/0061753 A1 | 3/2010 | Hase | |
| 2010/0074667 A1 | 3/2010 | Ehara et al. | |
| 2010/0092220 A1 | 4/2010 | Hasegawa et al. | |
| 2010/0092221 A1 | 4/2010 | Shinshi et al. | |
| 2010/0150623 A1* | 6/2010 | Matsumoto | 399/329 |

| | | |
|---|---|---|
| 2010/0202809 A1 | 8/2010 | Shinshi et al. |
| 2010/0290822 A1 | 11/2010 | Hasegawa et al. |
| 2010/0303521 A1 | 12/2010 | Ogawa et al. |
| 2011/0026988 A1 | 2/2011 | Yoshikawa et al. |
| 2011/0044706 A1 | 2/2011 | Iwaya et al. |
| 2011/0044734 A1 | 2/2011 | Shimokawa et al. |
| 2011/0052237 A1 | 3/2011 | Yoshikawa et al. |
| 2011/0052245 A1 | 3/2011 | Shinshi et al. |
| 2011/0052277 A1 | 3/2011 | Ueno et al. |
| 2011/0052282 A1 | 3/2011 | Shinshi et al. |
| 2011/0058862 A1 | 3/2011 | Yamaguchi et al. |
| 2011/0058863 A1 | 3/2011 | Shinshi et al. |
| 2011/0058864 A1 | 3/2011 | Fujimoto et al. |
| 2011/0058865 A1 | 3/2011 | Tokuda et al. |
| 2011/0058866 A1 | 3/2011 | Ishii et al. |
| 2011/0064437 A1 | 3/2011 | Yamashina et al. |
| 2011/0064443 A1 | 3/2011 | Iwaya et al. |
| 2011/0064450 A1 | 3/2011 | Ishii et al. |
| 2011/0064490 A1 | 3/2011 | Imada et al. |
| 2011/0064502 A1 | 3/2011 | Hase et al. |
| 2011/0076071 A1 | 3/2011 | Yamaguchi et al. |
| 2011/0085815 A1 | 4/2011 | Kishi et al. |
| 2011/0085832 A1 | 4/2011 | Hasegawa et al. |
| 2011/0091253 A1 | 4/2011 | Seo et al. |
| 2011/0116848 A1* | 5/2011 | Yamaguchi et al. .......... 399/329 |
| 2011/0129268 A1 | 6/2011 | Ishii et al. |
| 2011/0150518 A1 | 6/2011 | Hase et al. |
| 2011/0170917 A1 | 7/2011 | Yoshikawa et al. |
| 2011/0176821 A1 | 7/2011 | Hase |
| 2011/0176822 A1 | 7/2011 | Ishii et al. |
| 2011/0182634 A1 | 7/2011 | Ishigaya et al. |
| 2011/0182638 A1 | 7/2011 | Ishii et al. |
| 2011/0194870 A1 | 8/2011 | Hase et al. |
| 2011/0200368 A1 | 8/2011 | Yamaguchi et al. |
| 2011/0200370 A1 | 8/2011 | Ikebuchi et al. |
| 2011/0206427 A1 | 8/2011 | Iwaya et al. |
| 2011/0211876 A1 | 9/2011 | Iwaya et al. |
| 2011/0217056 A1 | 9/2011 | Yoshinaga et al. |
| 2011/0217057 A1 | 9/2011 | Yoshinaga et al. |
| 2011/0217093 A1 | 9/2011 | Tokuda et al. |
| 2011/0217095 A1 | 9/2011 | Ishii et al. |
| 2011/0222875 A1 | 9/2011 | Imada et al. |
| 2011/0222876 A1 | 9/2011 | Yuasa et al. |
| 2011/0222888 A1 | 9/2011 | Ikebuchi et al. |
| 2011/0222929 A1 | 9/2011 | Fujimoto et al. |
| 2011/0222930 A1 | 9/2011 | Fujimoto et al. |
| 2011/0222931 A1 | 9/2011 | Shinshi et al. |
| 2011/0229162 A1 | 9/2011 | Ogawa et al. |
| 2011/0229178 A1 | 9/2011 | Ogawa et al. |
| 2011/0229181 A1 | 9/2011 | Iwaya et al. |
| 2011/0229200 A1 | 9/2011 | Yamaguchi et al. |
| 2011/0229225 A1 | 9/2011 | Ishii et al. |
| 2011/0229226 A1 | 9/2011 | Tokuda et al. |
| 2011/0229227 A1 | 9/2011 | Yoshikawa et al. |
| 2011/0229228 A1 | 9/2011 | Yoshikawa et al. |
| 2011/0229236 A1 | 9/2011 | Ehara et al. |
| 2011/0274453 A1 | 11/2011 | Shimokawa et al. |
| 2011/0286758 A1 | 11/2011 | Yoshinaga |
| 2011/0293309 A1 | 12/2011 | Hase |
| 2011/0311284 A1 | 12/2011 | Seo et al. |
| 2012/0045226 A1 | 2/2012 | Hase et al. |
| 2012/0051766 A1 | 3/2012 | Ueno et al. |
| 2012/0051774 A1 | 3/2012 | Ikebuchi et al. |
| 2012/0093531 A1 | 4/2012 | Yuasa et al. |
| 2012/0093551 A1 | 4/2012 | Ogawa et al. |
| 2012/0107005 A1 | 5/2012 | Hase et al. |
| 2012/0114345 A1 | 5/2012 | Fujimoto et al. |
| 2012/0114354 A1 | 5/2012 | Saito et al. |
| 2012/0121303 A1 | 5/2012 | Takagi et al. |
| 2012/0121304 A1 | 5/2012 | Tokuda et al. |
| 2012/0121305 A1 | 5/2012 | Yoshikawa et al. |
| 2012/0148303 A1 | 6/2012 | Yamaguchi et al. |
| 2012/0155935 A1 | 6/2012 | Yoshikawa et al. |
| 2012/0155936 A1 | 6/2012 | Yamaguchi et al. |
| 2012/0177388 A1 | 7/2012 | Imada et al. |
| 2012/0177393 A1 | 7/2012 | Ikebuchi et al. |
| 2012/0177420 A1 | 7/2012 | Shimokawa et al. |
| 2012/0177423 A1 | 7/2012 | Imada et al. |
| 2012/0177424 A1 | 7/2012 | Saito et al. |
| 2012/0207523 A1 | 8/2012 | Ueno et al. |
| 2012/0219312 A1 | 8/2012 | Yuasa et al. |
| 2012/0224878 A1 | 9/2012 | Ikebuchi et al. |
| 2012/0237273 A1 | 9/2012 | Yoshinaga et al. |

FOREIGN PATENT DOCUMENTS

| | | |
|---|---|---|
| JP | 2003-140492 | 5/2003 |
| JP | 2004-109878 | 4/2004 |
| JP | 2005-250282 | 9/2005 |
| JP | 2007-334205 | 12/2007 |
| JP | 2009098211 A * | 5/2009 |
| JP | 2010-096782 | 4/2010 |
| JP | 2011-107362 | 6/2011 |

OTHER PUBLICATIONS

Machine translation of Okuno JP 2009-098211.*
U.S. Appl. No. 13/557,841, filed Jul. 25, 2012, Toshihiko Shimokawa, et al.

* cited by examiner

*Primary Examiner* — David Gray
*Assistant Examiner* — Sevan A Aydin
(74) *Attorney, Agent, or Firm* — Harness, Dickey & Pierce, P.L.C.

(57) ABSTRACT

A fixing device includes an endless flexible belt, a stationary pad, a rotary pressure member, and a lubrication mechanism. The endless flexible belt is looped into a generally cylindrical configuration extending in an axial direction thereof for rotation in a rotational, circumferential direction thereof. The stationary pad is stationarily disposed inside the loop of the belt. The rotary pressure member is disposed parallel to the belt. The rotary pressure member presses against the stationary pad via the belt to form a nip therebetween, through which a recording medium is conveyed in a conveyance direction. The lubrication mechanism supplies lubricant between the stationary pad and the belt, and includes a first sheet of lubricant-impregnated material and a second sheet of lubricant-impregnated material.

18 Claims, 7 Drawing Sheets

FIXING DEVICE AND ENDLESS BELT ASSEMBLY

CROSS-REFERENCE TO RELATED APPLICATION

The present patent application claims priority pursuant to 35 U.S.C. §119 from Japanese Patent Application No. 2012-011854, filed on Jan. 24, 2012, which is hereby incorporated by reference herein in its entirety.

BACKGROUND OF THE INVENTION

1. Technical Field

The present invention relates to a fixing device and an endless belt assembly, and more particularly, to a fixing device and an endless belt assembly for use in an image forming apparatus, such as a photocopier, facsimile machine, printer, plotter, or multifunctional machine incorporating several of these features.

2. Background Art

In electrophotographic image forming apparatuses, such as photocopiers, facsimile machines, printers, plotters, or multifunctional machines incorporating several of these features, an image is formed by attracting developer or toner particles to a photoconductive surface for subsequent transfer to a recording medium such as a sheet of paper. After transfer, the imaging process is followed by a fixing process using a fixing device, which permanently fixes the toner image in place on the recording medium with heat and pressure.

In general, a fixing device employed in electrophotographic image formation includes a pair of generally cylindrical looped belts or rollers, one being heated for fusing toner ("fuser member") and the other being pressed against the heated one ("pressure member"), which together form a heated area of contact called a fixing nip. As a recording medium bearing a toner image thereupon enters the fixing nip, heat from the fuser member causes the toner particles to fuse and melt, while pressure between the fuser and pressure members causes the molten toner to set onto the recording medium.

Various methods have been proposed to provide a fast, reliable fixing process that can process a toner image with short warm-up time and first-print time without causing image defects even at high processing speeds.

For example, a known belt-based fixing device employs an endless flexible fuser belt looped into a generally cylindrical configuration extending in an axial direction thereof for rotation in a rotational, circumferential direction thereof. In this fixing device, a stationary fuser pad is disposed inside the loop of the belt, with a pressure roller disposed parallel to the belt to press against the fuser pad via the belt to form a fixing nip therebetween. A generally flat, reinforcing plate having its narrow face in contact with the fuser pad is disposed inside the loop of the belt to reinforce the fuser pad against nip pressure. Also provided is a low-friction sheet of lubricant-impregnated material that supplies lubricant between the stationary pad and the belt.

According to this method, the fuser belt is equipped with a tubular holder of thermally conductive metal, or heat pipe, disposed inside the loop of the fuser belt for heating the fuser belt through conduction. A heater is disposed inside the heat pipe, from which heat is imparted to the entire circumference of the fuser belt looped around the heat pipe. The heat pipe has a longitudinal side slot defined on one side thereof, within which the fuser pad is accommodated. Provision of the slotted heat pipe thus enables the fuser pad to maintain its proper operational position while subjected to external forces during operation.

The inventors have recognized that one problem associated with the belt-based fixing device is that the lubrication mechanism, provided between the stationary pad and the belt, prematurely fails to work over time. Premature failure of the lubrication mechanism may occur, for example, where the low-friction sheet eventually becomes depleted of lubricant, as it gradually releases lubricant to the inner circumferential surface of the belt or elsewhere around the fuser assembly. Not surprisingly, lubrication failure in the fuser belt assembly entails various adverse consequences, including accelerated degradation due to abrasion of the fuser pad and the belt at the fixing nip.

SUMMARY OF THE INVENTION

Exemplary aspects of the present invention are put forward in view of the above-described circumstances, and provide a novel fixing device.

In one exemplary embodiment, the fixing device includes an endless flexible belt, a stationary pad, a rotary pressure member, and a lubrication mechanism. The endless flexible belt is looped into a generally cylindrical configuration extending in an axial direction thereof for rotation in a rotational, circumferential direction thereof. The stationary pad is stationarily disposed inside the loop of the belt. The rotary pressure member is disposed parallel to the belt. The rotary pressure member presses against the stationary pad via the belt to form a nip therebetween, through which a recording medium is conveyed in a conveyance direction. The lubrication mechanism supplies lubricant between the stationary pad and the belt, and includes a first sheet of lubricant-impregnated material and a second sheet of lubricant-impregnated material. The first sheet of lubricant-impregnated material covers the stationary pad to intervene between the stationary pad and the belt across the nip. The second sheet of lubricant-impregnated material is disposed in contact with the first sheet at a position outside the nip.

Other exemplary aspects of the present invention are put forward in view of the above-described circumstances, and provide a novel endless belt assembly.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

Figure 1:
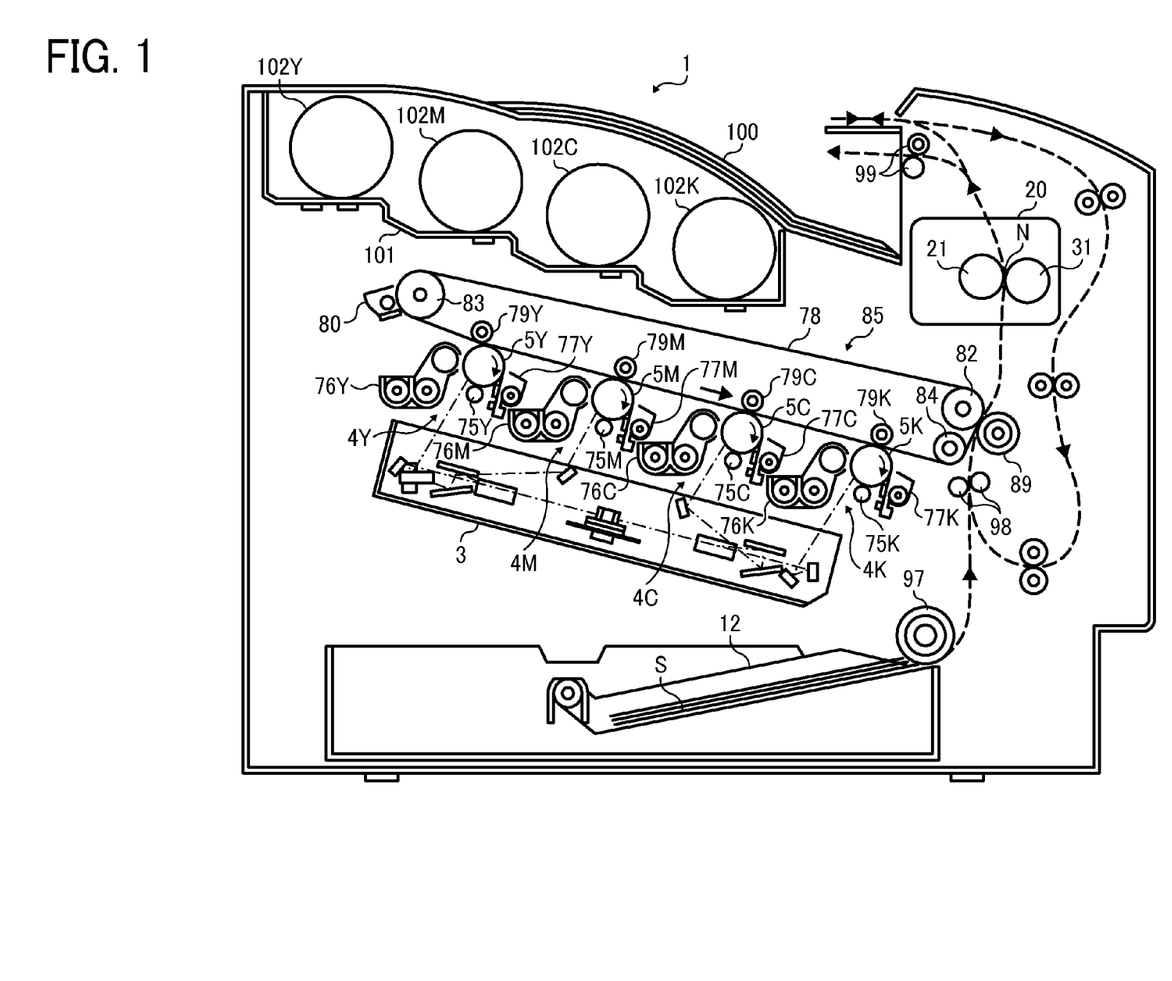
FIG. 1 schematically illustrates an image forming apparatus incorporating a fixing device according to one or more embodiments of this patent specification.

FIG. 1 schematically illustrates an image forming apparatus 1 incorporating a fixing device 20 according to one or more embodiments of this patent specification.

As shown in FIG. 1, the image forming apparatus 1 is a tandem color printer including four imaging stations 4Y, 4M, 4C, and 4K arranged in series along the length of an intermediate transfer unit 85 and adjacent to an exposure unit 3, which together form an electrophotographic mechanism to form an image with toner particles on a recording medium such as a sheet of paper S, for subsequent processing through the fixing device 20 located above the intermediate transfer unit 85.

The image forming apparatus 1 also includes a feed roller 97, a pair of registration rollers 98, a pair of discharge rollers 99, and other conveyor and guide members together defining a sheet conveyance path, indicated by broken lines in the drawing, along which a recording sheet S advances upward from a bottom sheet tray 12 accommodating a stack of recording sheets toward the intermediate transfer unit 85 and then through the fixing device 20 to finally reach an output tray 100 situated atop the apparatus body.

In the image forming apparatus 1, each imaging unit (indicated collectively by the reference numeral 4) has a drum-shaped photoconductor 5 surrounded by a charging device 75, a development device 76, a cleaning device 77, and a discharging device, which work in cooperation to form a toner image of a particular primary color, as designated by the suffixes "Y" for yellow, "M" for magenta, "C" for cyan, and "K" for black. The imaging units 4Y, 4M, 4C, and 4K are supplied with toner from detachably attached, replaceable toner bottles 102Y, 102M, 102C, and 102K, respectively, accommodated in a bottle rack 101 in the upper portion of the apparatus body.

The intermediate transfer unit 85 includes an intermediate transfer belt 78, four primary transfer rollers 79Y, 79M, 79C, and 79K, a secondary transfer roller 89, and a belt cleaner 80, as well as a transfer backup roller or drive roller 82, a cleaning backup roller 83, and a tension roller 84 around which the intermediate transfer belt 78 is entrained. When driven by the roller 82, the intermediate transfer belt 78 travels counterclockwise in the drawing along an endless travel path, passing through four primary transfer nips defined between the primary transfer rollers 79 and the corresponding photoconductive drums 5, as well as a secondary transfer nip defined between the transfer backup roller 82 and the secondary transfer roller 89.

The fixing device 20 includes a fuser member 21 and a pressure member 31, one being heated and the other being pressed against the heated one, to form a fixing nip N therebetween in the sheet conveyance path. A detailed description of the fixing device 20 and its associated structure will be given later with reference to FIG. 2 and subsequent drawings.

During operation, each imaging unit 4 rotates the photoconductor drum 5 clockwise in the drawing to forward its outer, photoconductive surface to a series of electrophotographic processes, including charging, exposure, development, transfer, and cleaning, in one rotation of the photoconductor drum 5.

First, the photoconductive surface is uniformly charged by the charging device 75 and subsequently exposed to a modulated laser beam emitted from the exposure unit 3. The laser exposure selectively dissipates the charge on the photoconductive surface to form an electrostatic latent image thereon according to image data representing a particular primary color. Then, the latent image enters the development device 76, which renders the incoming image visible using toner. The toner image thus obtained is forwarded to the primary transfer nip between the intermediate transfer belt 78 and the primary transfer roller 79.

At the primary transfer nip, the primary transfer roller 79 is supplied with a bias voltage of a polarity opposite that of the toner on the photoconductor drum 5. This electrostatically transfers the toner image from the photoconductive surface to an outer surface of the belt 78, with a certain small amount of residual toner particles left on the photoconductive surface. Such transfer process occurs sequentially at the four primary transfer nips along the belt travel path, so that toner images of different colors are superimposed one atop another to form a single multicolor image on the surface of the intermediate transfer belt 78.

After primary transfer, the photoconductive surface enters the cleaning device 77 to remove residual toner by scraping it off with a cleaning blade, and then to the discharging device to remove residual charges for completion of one imaging cycle. At the same time, the intermediate transfer belt 78 forwards the multicolor image to the secondary transfer nip between the transfer backup roller 82 and the secondary transfer roller 89.

Meanwhile, in the sheet conveyance path, the feed roller 97 rotates counterclockwise in the drawing to introduce a recording sheet S from the sheet tray 12 toward the pair of registration rollers 98 being rotated. Upon receiving the fed sheet S, the registration rollers 98 stop rotation to hold the incoming sheet S therebetween, and then advance it in sync with the movement of the intermediate transfer belt 78 to the secondary transfer nip. At the secondary transfer nip, the multicolor image is transferred from the belt 78 to the recording sheet S, with a certain small amount of residual toner particles left on the belt surface.

After secondary transfer, the intermediate transfer belt 78 enters the belt cleaner 80, which removes and collects residual toner from the intermediate transfer belt 78. At the same time, the recording sheet S bearing the powder toner image thereon is introduced into the fixing device 20, which fixes the multicolor image in place on the recording sheet S with heat and pressure through the fixing nip N.

Thereafter, the recording sheet S is ejected by the discharge rollers 99 to the output tray 100 for stacking outside the apparatus body, which completes one operational cycle of the image forming apparatus 1.

Figure 2:
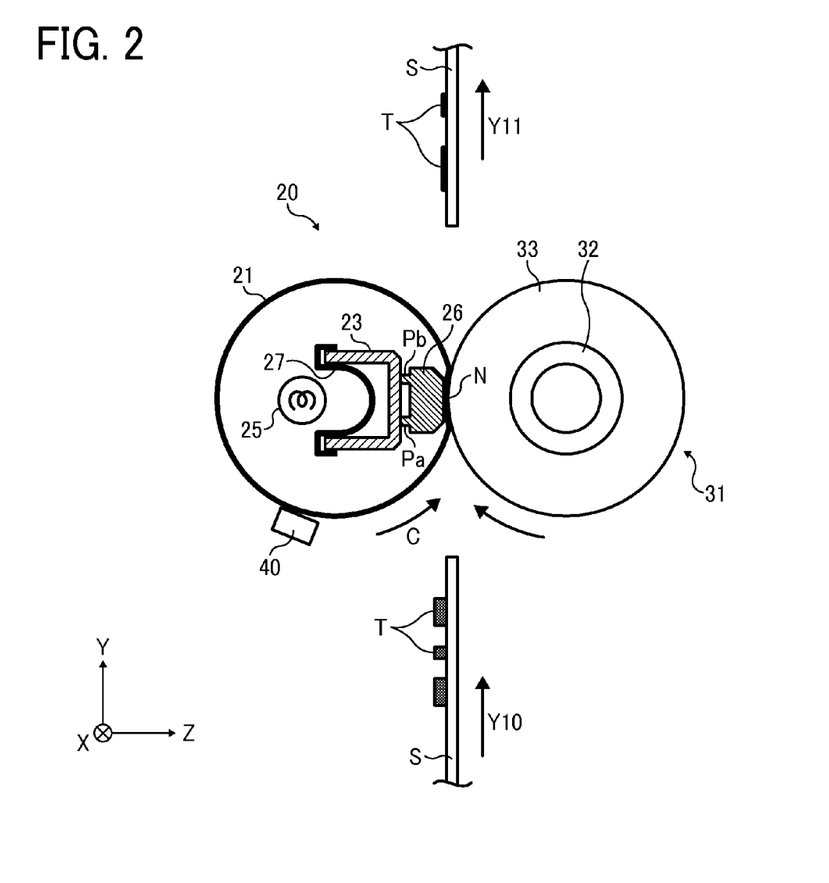
FIG. 2 is an axial cross-sectional view of the fixing device according to one embodiment of this patent specification.

FIG. 2 is an axial cross-sectional view of the fixing device 20 according to one embodiment of this patent specification.

As shown in FIG. 2, the fixing device 20 includes an endless flexible fuser belt 21 looped into a generally cylindrical configuration extending in a longitudinal, axial direction X thereof for rotation in a rotational, circumferential direction C thereof; a stationary, fuser pad 26 stationarily disposed inside the loop of the belt 21; and a pressure roller 31 disposed parallel to the belt 21. The pressure roller 31 presses against the fuser pad 26 via the belt 21 to form a fixing nip N therebetween, through which a recording medium S is conveyed in a conveyance direction Y.

Also included in the fixing device 20 are a reinforcing member 23 stationarily disposed in contact with the fuser pad 26 inside the loop of the belt 21 for reinforcing the fuser pad 26; a heater 25 disposed adjacent to the belt 21 to heat the belt 21; a reflector 27 disposed on the reinforcing member 23 to reflect radiation from the heater 25; and a temperature sensor 40 disposed facing the belt 21 to detect temperature at the belt surface.

Figure 3:
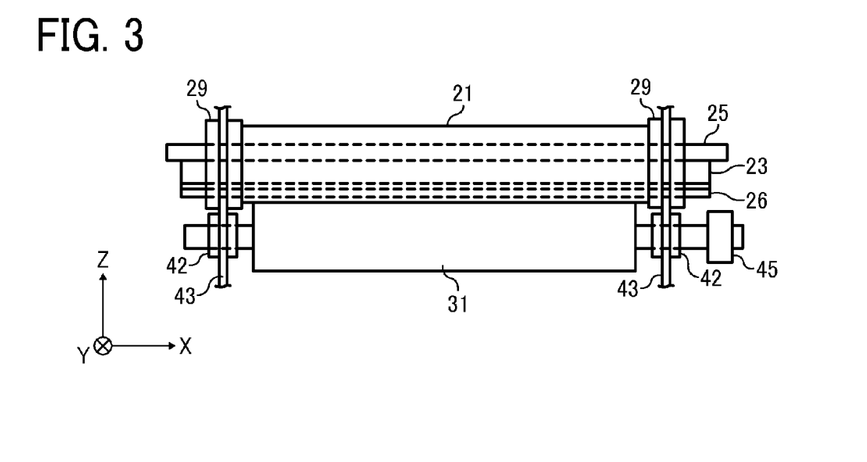
FIG. 3 is a side-on, lateral view of the fixing device of FIG. 2.

With additional reference to FIG. 3, which is a side-on, lateral view of the fixing device 20 of FIG. 2, components of the fixing device 20 are shown accommodated in a space defined between a pair of parallel sidewalls 43. Elongated components of the fixing device 20, such as, for example, the fuser belt 21, the fuser pad 26, the reinforcing member 23, the heater 25, and the pressure roller 31, extend generally in parallel with each other and have their respective longitudinal ends supported on the sidewalls 43 either directly or indirectly.

Additionally, a pair of retaining flanges 29 is provided on the sidewalls 43, one connected to an axial end of the looped belt 21, to retain the belt 21 in the generally cylindrical configuration thereof. Note that the fuser belt 21 does not have any guide structure, such as a tubular holder of thermally conductive metal, or heat pipe, for guiding its inner circumferential surface therealong during rotation, except for the retaining flanges 29 retaining the belt 21 in shape at the axial ends thereof, and the fuser pad 26 contacting the belt 21 along the fixing nip N.

As used herein, the term "axial direction X" refers to a longitudinal direction in which the looped belt 21 extends in its generally cylindrical configuration. The term "circumferential direction C" refers to a direction along a circumference of the looped belt 21 in its generally cylindrical configuration. The term "conveyance direction Y" refers to a direction perpendicular to the axial direction X, or more precisely, the direction tangential to the cylindrical configuration of the looped belt 21 at the fixing nip N, in which the recording medium S is conveyed along the fixing nip N, and which overlaps the circumferential direction C of the looped belt 21 at the fixing nip N. The term "load direction Z" refers to a direction perpendicular to the axial direction X and the conveyance direction Y, in which the pressure member presses against the fuser pad 26 to establish the fixing nip N.

During operation, upon activation of the image forming apparatus 1, power supply circuitry starts supplying power to the heater 25, whereas a rotary drive motor activates the pressure roller 31 to rotate clockwise in the drawing, which in turn rotates the fuser belt 21 counterclockwise in the drawing due to friction between the belt and roller surfaces.

Then, a recording sheet S bearing an unfixed, powder toner image T, which has been transferred through the secondary transfer nip, enters the fixing device 20 while guided along a suitable guide mechanism in the conveyance direction Y10. As the fuser belt 21 and the pressure roller 31 rotate together, the recording sheet S advances through the fixing nip N to fix the toner image T in place, wherein heat from the fuser belt 21 causes the toner particles to fuse and melt, while pressure between the fuser pad 26 and the pressure roller 31 causes the molten toner to set onto the recording sheet S. Upon exiting the fixing nip N, the recording sheet S is forwarded to a subsequent destination in the conveyance direction Y11.

Figure 4:
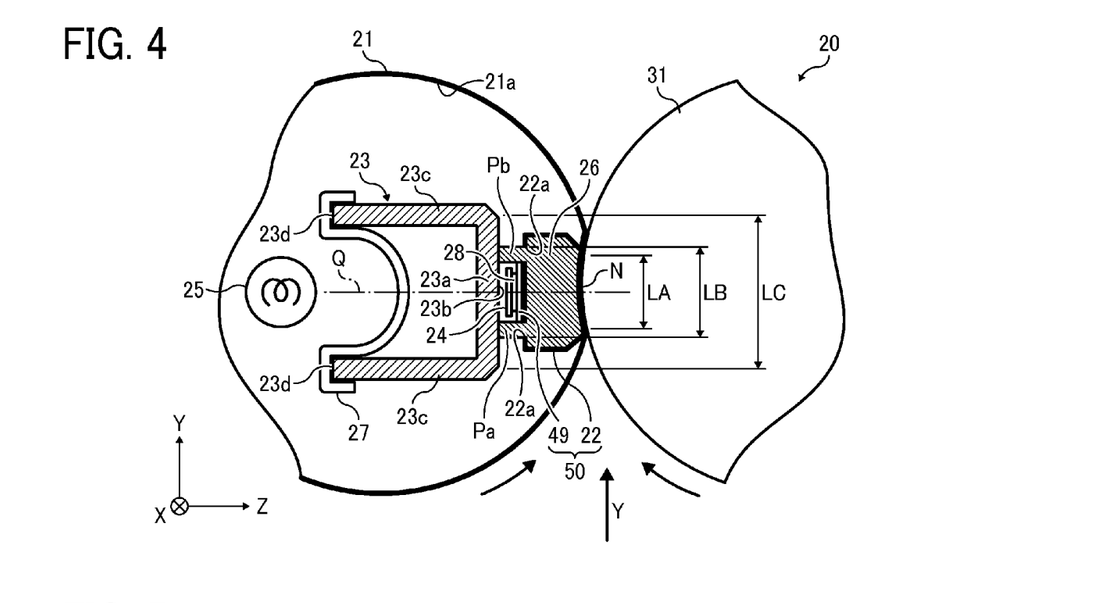
FIG. 4 is an enlarged view of the fixing device of FIG. 2, shown with a lubrication mechanism according to one embodiment of this patent specification.

With reference to FIG. 4, which is an enlarged view of the fixing device 20 of FIG. 2, the fixing assembly is shown further including a lubrication mechanism 50 to supply lubricant between the stationary pad 26 and the belt 21, one or more screws 24 to fasten the mechanism 50 onto the fuser pad 26, and a securing plate 28 disposed where the lubrication mechanism 50 is screwed to secure the mechanism 50 in place on the fuser pad 26.

Components inside the loop of the fuser belt 21, including the stationary pad 26, the lubrication mechanism 50, the screws 24, and the securing plate 28, as well as the reinforcing member 23, the heater 25, and the reflector 27, are all stationarily disposed inside the loop of the fuser belt 21.

As used herein, the term "stationary" or "stationarily disposed" is used to describe a state in which a component, such as the fuser pad or the reinforcing member, remains still and do not move or rotate as the pressure roller and the fuser belt rotate during operation of the fixing device. Hence, a stationary member may still be subjected to external mechanical force and pressure resulting from its intended use (e.g., the stationary fuser pad pressed against the pressure member by a spring or biasing member), but only to an extent that does not cause substantial movement, rotation, or displacement of the stationary member.

Specifically, in the fixing device 20, the fuser belt 21 comprises a flexible, endless belt consisting of an inner, thermally conductive substrate defining an inner circumferential surface 21a (i.e., the surface that faces the fuser pad 26 inside the loop) of the belt 21, an intermediate elastic layer disposed on the substrate, and an outer release layer disposed on the intermediate elastic layer, which together form a multilayered structure with a thickness of approximately 1 mm or thinner. The belt 21 is looped into a generally cylindrical configuration, approximately 15 mm to approximately 120 mm in diameter. In the present embodiment, the fuser belt 21 is a multilayered endless belt having an outer diameter of approximately 30 mm in its looped, generally cylindrical configuration.

More specifically, the substrate of the belt 21 may be formed of thermally conductive material, approximately 30 µm to approximately 50 µm thick, including nickel, stainless, or any suitable metal, as well as synthetic resin such as polyimide (PI). The elastic layer of the belt 21 may be a deposit of rubber, such as solid or foamed silicone rubber, fluorine resin, or the like, approximately 100 µm to approximately 300 µm thick on the substrate. The outer release layer may be a deposit of a release agent, such as tetra fluoro ethylene-per-fluoro alkylvinyl ether copolymer or PFA, polytetrafluoroethylene (PTFE), polyimide (PI), polyetherimide (PEI), polyethersulfide (PES), or the like, approximately 5 to 50 µm in thickness on the elastic layer.

The intermediate elastic layer serves to accommodate minute variations in applied pressure to maintain smoothness of the belt surface at the fixing nip N, which ensures uniform distribution of heat across the recording sheet S to yield a resulting print with a smooth, consistent appearance without artifacts, such as an orange peel-like texture. The release layer provides good stripping of toner from the belt surface to ensure the recording sheet S is properly conveyed through the fixing nip N.

Figure 5:
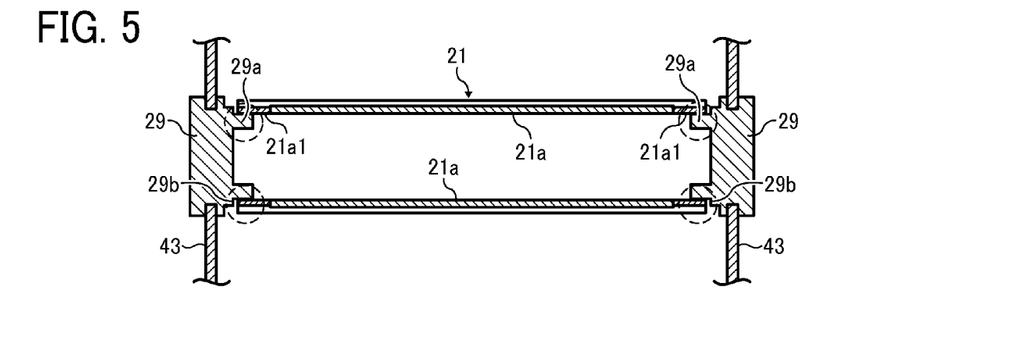
FIG. 5 is a lateral cross-sectional view of an endless belt assembly included in the fixing device of FIG. 2.

With additional reference to FIG. 5, which is a lateral cross-sectional view of the endless belt assembly included in the fixing device 20 of FIG. 2, the fuser belt 21 is shown having its opposed longitudinal ends rotatably supported on the pair of retaining flanges 29 mounted to the sidewalls 43.

The pair of retaining flanges 29 each comprises a piece of suitable material, such as heat-resistant plastic. The retaining flange 29 has a generally circular guide edge 29a around which the axial end of the belt 21 is seated to keep the belt 21 in shape and position, and a recessed stopper edge 29b around the guide edge 29a facing the axial end of the belt 21 to restrict lateral displacement or walk of the belt 21 in the axial direction X thereof.

A pair of low-friction surfaces 21a1 may be provided on those portions of the belt 21 which slide along the guide edge 29a as the belt 21 rotates in the circumferential direction C thereof. Such low-friction surface 21a1 may be formed, for example, by depositing a coating of lubricant, such as fluorine resin or the like, on selected portions of the substrate of the belt 21, as indicated by dotted circles in FIG. 5. Provision of the low-friction surfaces 21a1 protects the fuser belt 21 and the guide edges 29a of the flange 29 against abrasion or deterioration due to sliding contact between the belt 21 and the guide edges 29a during rotation of the belt 21.

Optionally, to prevent damage from excessive abrasion between the longitudinal end of the belt 21 and the retaining flange 29, an annular slip ring, separate from the flange 29, may be provided around the stopper edge 29b of the flange 29. Such slip ring may be formed of a suitable low-friction, heat resistant material, such as polyether ether ketone (PEEK), polyphenylene sulfide (PPS), polyamide-imide (PAI), PTFE, or the like, which exhibits a sufficiently low coefficient of friction with respect to the belt material.

Assembled with the retaining flanges 29, the fuser belt 21 can maintain its looped, generally cylindrical configuration, while kept in its proper operational position spaced apart the reinforcing member 23 and the reflector 27 disposed inside the loop of the belt 21. To prevent interference between the fuser belt 21 and the adjacent structure even where the flexible belt 21 deforms at its longitudinal center during rotation, spacing between the belt 21 and each adjacent structure may be dimensioned depending on rigidity of the belt material. For example, a lower limit of such spacing may be set to approximately 0.02 mm where the belt material is relatively rigid and to approximately 3 mm where the belt material is relatively soft.

With continued reference to FIG. 4, the heater 25 is shown configured as a radiant heater, such as a halogen heater or a carbon heater, disposed inside the loop of the belt 21 to radiate heat to the belt 21. For example, the heater 25 may be an elongated halogen heater having a pair of longitudinal ends thereof secured to the sidewalls 43 of the fixing device 20. Although a single heater is used in the present embodiment, the heater 25 may be configured otherwise than disclosed herein, and multiple heating elements may be disposed inside the loop of the belt 21.

During operation, the heater 25 radiates heat to the entire length of the belt 21 except at the fixing nip N, such that the belt 21 conducts heat to the toner image T on the recording sheet S passing through the fixing nip N. Operation of the heater 25 is controlled based on readings of the temperature sensor 40, such as a thermometer or thermistor, disposed facing an outer circumferential surface of the belt 21 to detect the belt temperature, so as to adjust the belt temperature to a desired fixing temperature.

Heating the belt 21 from inside the belt loop allows for an energy-efficient, fast compact fixing process that can print with short warm-up time and first-print time without requiring a complicated or expensive heating assembly. That is, compared to radiation directed to a local, limited area of the belt, radiation from the heater 25 can simultaneously reach a relatively large area along the circumference of the belt 21, resulting in a sufficient amount of heat imparted to the belt 21 to prevent image defects even at high processing speeds. In particular, compared to a configuration in which the fuser belt is indirectly heated through conduction from a heat pipe, direct radiant heating of the belt 21 with the heater 25 allows for a higher energy efficiency, leading to a compact, low-cost configuration of the belt-based fixing device.

The fuser pad 26 comprises an elongated piece of sufficiently rigid material having its opposed longitudinal ends supported on the pair of retaining flanges 29 mounted to the sidewalls 43. Examples of suitable material for the fuser pad 26 include metal or resin, in particular, heat-resistant, thermally insulative resin, such as liquid crystal polymer (LCP), PAI, polyethersulfone (PES), PPS, polyether nitrile (PEN), PEEK, or the like, which does not substantially bend or deform under pressure from the pressure roller 31 during operation. In the present embodiment, the fuser pad 26 is formed of LCP.

The fuser pad 26 has a smooth, slidable contact surface defined on its front side to face the pressure roller 31. In this embodiment, the slidable contact surface of the fuser pad 26 is slightly concave with a curvature similar to that of the circumference of the pressure roller 31. Such a configuration allows the contact surface to conform readily to the circumferential surface of the pressure roller 31, which prevents the recording sheet S from adhering to or winding around the fuser belt 21 upon exiting the fixing nip N, leading to reliable conveyance of the recording sheet S after fixing process.

Alternatively, instead of the curved configuration, the slidable contact surface of the fuser pad 26 may be substantially flat. Such a flat contact surface remains parallel to the recording sheet S entering the fixing nip N, causing the printed surface of the sheet S to remain flat and thus closely contact the fuser belt 21, leading to good fixing performance through the fixing nip N. Flattening the contact surface also facilitates ready stripping of the recording sheet S from the fuser belt 21, as it causes the flexible belt 21 to exhibit a curvature larger at the exit of the fixing nip N than within the fixing nip N.

The reinforcing member 23 comprises an elongated stay of rigid material having a length substantially identical to that of the fuser pad 26. The reinforcing member 23 supports the fuser pad 26 against pressure from the pressure roller 31 transmitted via the fuser belt 21, thereby protecting the fuser pad 26 from substantial bowing or deformation due to nip pressure. For providing sufficient reinforcement, the reinforcing member 23 may be formed of mechanically strong metal, such as stainless steel, iron, or the like, In the present embodiment, the reinforcing member 23 has a rectangular U-shaped axial cross-section, consisting of a center wall 23a defining a flat bearing surface 23b to contact the fuser pad 26, and a pair of parallel side, upstanding walls 23c, each extending perpendicular from the center wall 23a and having a free, distal edge 23d thereof pointing away from the center wall 23a. The reinforcing member 23 is disposed stationarily inside the loop of the belt 21, with the bearing surface 23b in contact with the fuser pad 26, and the distal edges 23d directed toward the heater 25, and is secured in position against the fuser pad 26 by having its longitudinal ends supported on the retaining flanges 29 at the axial ends of the fuser assembly.

Figure 6:
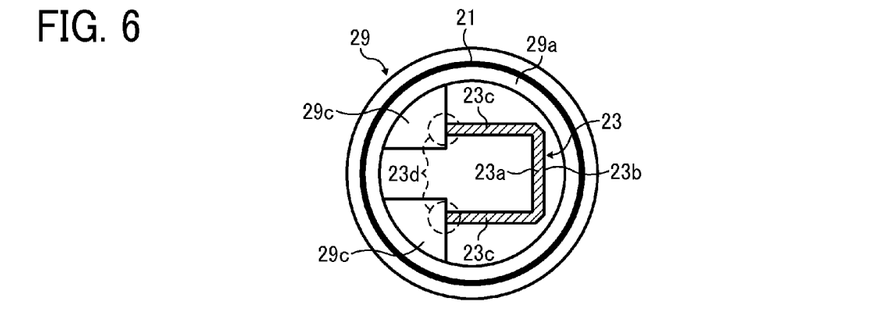
FIG. 6 is an end-on, axial partially cross-sectional view of the endless belt assembly included in the fixing device of FIG. 2.

With additional reference to FIG. 6, which is an end-on, axial partially cross-sectional view of the endless belt assembly included in the fixing device 20 of FIG. 2, the reinforcing member 23 is shown with the distal edges 23d of the upstanding walls 23c each seated on ribs 29c of the retaining flange 29. Alternatively, instead of the distal edges 23d contacting the ribs 29c, the reinforcing member 23 may be positioned through direct contact with the sidewalls 43 of the fixing device 20.

The reflector 27 comprises a plate of reflective material disposed stationarily on that side of the reinforcing member 23 facing the heater 25. Examples of suitable material for the reflector 27 include aluminum, stainless steel, and the like.

Provision of the reflective surface on the reinforcing member 23 allows for a high efficiency in heating the belt 21 with the radiant heater 25, as it directs incoming radiation from the heater 25 toward the inner circumferential surface 21a of the belt 21 instead of the reinforcing member 23, resulting in an increased amount of heat absorbed in the belt 21. Alternatively, instead of providing a reflective element separate from the reinforcing member 23, the reinforcing member 23 may be treated with mirror polish or insulation coating, either partially or entirely, to prevent heat from being absorbed in the reinforcing member 23, which in turn allows for increased absorption of heat into the belt 21.

As mentioned earlier, the fixing device 20 in the present embodiment employs a radiant heater disposed inside the loop of the fuser belt 21 to radiate heat to a relatively large area of the inner circumferential surface 21a of the belt 21. Such radiant heating of the belt distributes heat along the entire circumference of the belt 21 even where the belt 21 does not rotate. With the belt 21 thus heated thoroughly and uniformly during standby, the fixing device 20 can immediately process an incoming print job upon recovery from standby.

One problem encountered by a conventional on-demand fixing device is that radiant heating the fuser belt can cause an excessive amount of heat accumulating in the pressure roller during standby. Depending on the material of the pressure roller, typically a rubber-based cylinder, intense heating of the pressure roller results in accelerated aging of the pressure roller due to thermal degradation, or more seriously, compression set of rubber under nip pressure, that is, permanent deformation of the rubber-based roller away from the fuser pad, which is aggravated by heat at the fixing nip. Such permanent deformation of the pressure roller translates into variations in size and strength of the fixing nip, which would adversely affect fixing performance, or cause abnormal noise during rotation of the fixing members.

To address these and other problems, in the present embodiment, the reinforcing member 23 together with the reflector 27 are positioned between the fuser pad 26 and the heater 25 to isolate the fuser pad 26 from radiation from the heater 25 inside the loop of the fuser belt 21.

Specifically, isolating the fuser pad 26 from heat radiation in turn protects the pressure roller 31 against excessive heating, which would otherwise cause the pressure roller 31 to develop permanent deformation at the fixing nip N where the rubber-based roller is subjected to pressure and heat during standby.

In addition, isolating the fuser pad 26 from heat radiation also isolates lubricant between the fuser pad 26 and the fuser belt 21 against continuous, intense heating, which would otherwise cause lubricant to degrade due to heat combined with high pressure at the fixing nip N, leading to slip or other disturbed movement of the belt along the fuser pad.

Moreover, isolating the fuser pad 26 from heat radiation prevents an excessive amount of heat from being applied to the fuser belt 21 at the fixing nip N, resulting in immediate cooling of the recording sheet S upon exiting the fixing nip N. As the recording sheet S cools, the toner image on the recording sheet S becomes less viscous and less adhesive to the fuser belt 21 at the exit of the fixing nip N. Reduced adhesion of the toner image to the fuser belt 21 allows the recording sheet S to readily separate from the fuser belt 21 without winding around or jamming the fixing nip N, while preventing built-up of toner residues on the surface of the fuser belt 21.

The pressure roller 31 comprises a motor-driven, elastically biased cylindrical body formed of a hollowed core 32 of metal, covered with an elastic layer 33 of thermally insulating material, such as sponged or solid silicone rubber, fluorine rubber, or the like. An additional, thin outer layer of release agent, such as PFA, PTFE, or the like, may be deposited upon the elastic layer 33. In the present embodiment, the pressure roller 31 is approximately 30 mm in diameter.

The elastic layer 33 effectively absorbs extra pressure applied to the fuser pad 26 from the pressure roller 31, which protects the fuser pad 26 against deformation under nip pressure. The elastic layer 33 of sponged material also serves as an insulator that prevents heat conduction from the fuser belt 21 toward the pressure roller 31, leading to high thermal efficiency in heating the fuser belt 21 in the fixing device 20.

The pressure roller 31 is equipped with a biasing mechanism that elastically presses the cylindrical body against the fuser belt assembly. A gear 45 is provided to a shaft of the pressure roller 31 for connection to a gear train of a driving mechanism that imparts a rotational force or torque to rotate the cylindrical body. A pair of bearings 42 is provided to the axial ends of the pressure roller 31 to rotatably support the roller 31 in position onto the sidewalls 43 of the fixing device 20. Optionally, the pressure roller 31 may have a dedicated heater, such as a halogen heater, accommodated in the hollow interior of the metal core 32.

Although the fuser belt 21 and the pressure roller 31 are of an identical diameter in the present embodiment, instead, it is possible to provide the generally cylindrical fixing members 21 and 31 with different diameters. For example, it is possible to form the fuser belt 21 with a diameter smaller than that of the pressure roller 31, so that the fuser belt 21 exhibits a greater curvature than that of the pressure roller 31 at the fixing nip N, which effects good stripping of a recording sheet from the fuser belt 21 upon exiting the fixing nip N.

With specific reference to FIG. 4, the fixing device 20 according to this patent specification is shown including the lubrication mechanism 50 to supply lubricant between the stationary pad 26 and the belt 21.

As shown in FIG. 4, the lubrication mechanism 50 includes a first, low-friction sheet of lubricant-impregnated material 22 covering the stationary pad 26 to intervene between the stationary pad 26 and the belt 21 across the nip N, and a second, supplementary sheet of lubricant-impregnated material 49 disposed in contact with the first sheet 22 at a position outside the nip N.

During operation, the low-friction sheet 22 retains a constant, continuous supply of lubricant between the adjoining surfaces of the fuser pad 26 and the fuser belt 21, which protects the fuser pad 26 and the belt 21 against wear and tear due to abrasive, frictional contact between the pad and belt surfaces. As the first sheet 22 gradually releases lubricant to the inner circumferential surface of the belt 22 or elsewhere around the fuser assembly, a new supply of lubricant flows from the second sheet 49 to the first sheet 22 to replenish the first sheet 22.

Thus, in the fixing device 20, the endless belt assembly is provided with the lubrication mechanism 50 for lubricating the fuser belt 21 effectively and durably, in which the first sheet 22 of lubricant-impregnated material wraps around the fuser pad 26 to supply lubricant between the fuser pad 26 and the belt 21, and the second sheet 49 of lubricant-impregnated material contacts the first sheet to replenish the first sheet 22 with a new supply of lubricant.

The inventors have recognized that one problem associated with the belt-based fixing device is that the lubrication mechanism, provided between the stationary pad and the belt, prematurely fails to work over time. Premature failure of the lubrication mechanism may occur, for example, where the low-friction sheet eventually becomes depleted of lubricant, as it gradually releases lubricant to the inner circumferential surface of the belt or elsewhere around the fuser assembly. Not surprisingly, lubrication failure in the fuser belt assembly entails various adverse consequences, including accelerated degradation due to abrasion of the fuser pad and the belt at the fixing nip.

No such problems occur in the fixing device 20 incorporating the endless belt assembly according to this patent specification, wherein combined use of the first, low-friction sheet 22 with the second, supplementary sheet 49 allows an effective, durable, long-lasting lubricating capability that maintains the frictional resistance between the pad and belt surfaces sufficiently low over an extended period of time.

Further, the lubrication mechanism 50 according to this patent specification works well even where the fuser assembly employs a relatively thin, light low-friction sheet which can be accommodated within the limited space around the fuser pad while folded or bent around corners of the fuser pad, but which by itself cannot hold a sufficient amount of lubricant to prevent lubrication failure over an extended period of time.

In addition, the lubrication mechanism 50 is particularly effective where the fuser assembly has no sealing or packing structure that seals the opposed longitudinal ends of the looped belt, through which the lubricant would readily leak from inside the loop of the belt, resulting in an accelerated consumption of lubricant in the fuser assembly.

As mentioned earlier, the fuser assembly may employ a low-friction sheet wrapping around the fuser pad, while retaining a fuser belt in shape and position using a pair of retaining flanges, instead of a tubular belt holder of heat conductive material, or heat pipe, such that the fuser belt is subjected to direct heating with the heater inside the loop of the belt. Although allowing increased thermal efficiency and reduced overall size and cost of the fuser assembly, absence of the heat pipe means absence of an appropriate support to which any sealing or packing structure for the looped belt would be mounted. Even where the looped belt remains unsealed, the lubrication mechanism 50 can effectively compensate for possible leakage of lubricant from inside the loop of the belt.

In the present embodiment, the first and second sheets 22 and 49 are identical to each other in terms of sheet material, sheet thickness, and type of lubricant with which the sheet is impregnated. The first and second sheets 22 and 49, due to their identical physical or structural properties, exhibit an identical ability to be impregnated with lubricant, that is, the lubricating agent soaks into both sheets 22 and 49 at a uniform, homogeneous rate.

During operation, where the first sheet 22 remains saturated, no net flow of lubricant exists from the second sheet 49 to the first sheet 22 exists, which would otherwise cause the first sheet 22 to be loaded with an excessive amount of lubricant. Conversely, where the first sheet 22 loses a substantial amount of lubricant, for example, due to migration over the inner circumferential surface of the fuser belt 21, or leakage from inside the loop of the belt 21, a certain amount of lubricant flows from the second sheet 49 to the first sheet 22 to keep a uniform concentration of lubricant between the first and second sheets 22 and 49.

Providing the lubrication sheets 22 and 49 with identical impregnatability results in a regulated, moderate amount of lubricant present in the first sheet 22, leading to reliable lubrication between the fuser belt 21 and the fuser pad 26 over an extended period of time.

Further, in the present embodiment, the material of the first and second sheets 22 and 49 may be a web of fluorine resin, such as PTFE, which exhibits specific fabric properties, such as weave pattern, thread count, density, and the like. The thickness of the first and second sheets 22 and 49 may fall in a range from approximately 150 to approximately 500 µm. The first and second sheets 22 and 49 may be both impregnated with a lubricating agent such as silicone oil that exhibits a kinematic viscosity ranging from approximately 50 to approximately 1,000 centistokes (cSt).

Use of resin-based woven material promotes retention of lubricant in the lubrication sheets 22 and 49 as it provides a porous, fibrous structure within which the lubricating agent may be stably accommodated. Moreover, should the first sheet 22 be depleted of lubricant, the low-friction, fluorine resin material does not cause a substantial frictional resistance at the interface between the fuser pad 26 and the fuser belt 21.

The low-friction sheet 22 may be bonded to selected portions of the fuser pad 26, including, for example, a front side defining the fixing nip N and an edge or surface positioned upstream relative to a center of the fixing nip N in the conveyance direction Y (that is, the lower portion of the fuser pad in FIG. 4). Bonding the low-friction sheet 22 may be accomplished, for example, using a double-sided adhesive tape extending across a length of the sheet 22 in the longitudinal direction X. Such arrangement securely prevents the low-friction sheet 22 from separating from the fuser pad 26 as the fuser pad 21 rotates from downstream to upstream in the circumferential direction C thereof during operation.

With continued reference to FIG. 4, the low-friction sheet 22 in the present embodiment is shown wrapping around the stationary pad 26, such that the sheet 22 covers an entire surface of the fuser pad 26 except where the pad 26 contacts the reinforcing member 23.

Specifically, in the present embodiment, the stationary fuser pad 26 includes one or more contact portions P spaced apart from each other in the conveyance direction Y, each generally extending in the axial direction X of the belt 21 and protruding toward the reinforcing member 23 to contact the reinforcing member 23. The first sheet 22 has at least one perforation 22a defined therein through which the contact portions P are inserted to allow close fitting between the first sheet 22 and the stationary pad 26 except at the contact portions P. The second sheet 49 is disposed between the contact portions P of the stationary pad 26 to establish surface contact with the first sheet 22.

More specifically, the stationary pad 26 includes a pair of contact portions Pa and Pb, one positioned upstream and the other downstream from a center of the stationary pad 26 in the conveyance direction Y. Each of the upstream and downstream contact portions Pa and Pb defines a generally flat contact surface to establish surface contact with the bearing surface 23b of the reinforcing member 23.

Provision of the mutually spaced contact portions P allows for stable positioning of the stationary fuser pad 26 even where the fuser pad 26 is not equipped with a solid, sturdy retaining structure, such as one implemented in a tubular belt holder or heat pipe that has a longitudinal side slot for accommodating the fuser pad therein.

Consider a configuration in which the fuser pad has substantially no retaining structure, while provided with only a single contact portion to contact the reinforcing member. In general, such a contact portion is dimensioned substantially narrower than the width of the pad in the conveyance direction, or otherwise, is offset from the center of the pad in the conveyance direction. In such cases, without any retaining structure, the fuser pad is susceptible to displacement from its proper operational position where pressure from the pressure roller forces the fuser pad to tilt or pivot about the contact portion, resulting in dimensional variations in the fixing nip and concomitant failures, such as defective fixing performance and faulty conveyance of recording media through the fixing nip.

By contrast, the fuser pad 26 in the present embodiment can remain stable and secure in position. That is, the fuser pad 26 does not tilt or pivot around each contact portion P even when subjected to nip pressure, since the multiple mutually spaced contact portions P, encompassing a relatively large area across the fuser pad 26 in the conveyance direction Y, promotes even, uniform contact between the fuser pad 26 and the reinforcing member 23 while effectively dispersing external forces acting on the fuser pad 23 during operation. Well-balanced positioning of the fuser pad 26 may be obtained particularly where the pair of contact portions Pa and Pb is provided, one positioned upstream and the other downstream from a center of the stationary pad 26 in the conveyance direction Y, as is the case with the present embodiment.

Moreover, provision of the mutually spaced contact portions P allows for high thermal efficiency in the fuser assembly, as it can reduce a total area of contact between the fuser pad 26 and the reinforcing member 23, compared to that necessary where the fuser pad has a single continuous contact surface to contact the reinforcing member. A reduction in the contact area between the fuser pad 26 and the reinforcing member 23 translates into a reduced amount of heat escaping from the fuser belt 21 to the reinforcing member 23 via the fuser pad 26, leading to increased thermal efficiency in the fuser assembly. This is particularly true where the fuser belt 21 readily loses substantial heat through conduction to the fuser pad 26, for example, due to the fuser belt 21 being of a relatively thin substrate (such as one with a thickness on the order of 160 μm or less), or due to the fixing nip N having a relatively large width in the conveyance direction Y.

Figure 7A:
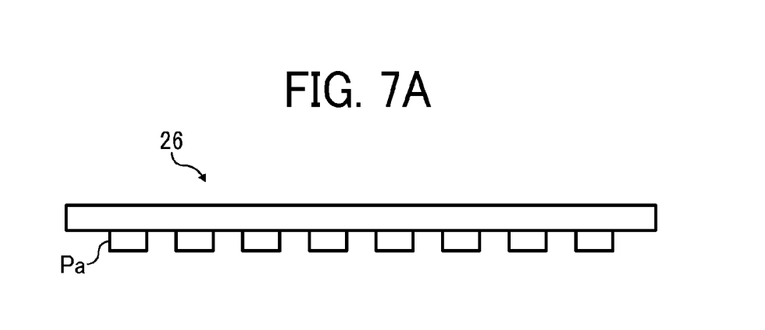
FIGS. 7A and 7B are side-elevation and plan views, respectively, of a stationary fuser pad before assembly into the fixing device of FIG. 2.
Figure 7B:
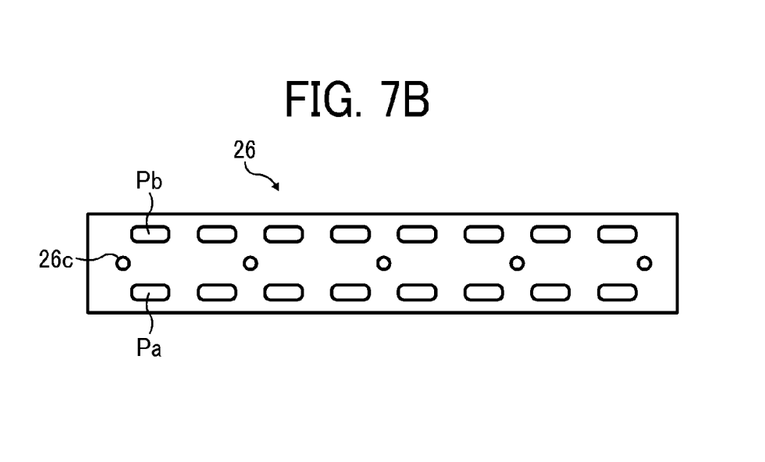

FIGS. 7A and 7B are side-elevation and plan views, respectively, of the stationary fuser pad 26 before assembly into the fixing device 20 of FIG. 2.

As shown in FIGS. 7A and 7B, each of the contact portions Pa and Pb of the fuser pad 26 includes a series of mutually spaced protrusions arranged in the axial direction X of the belt 21.

Specifically, in the present embodiment, each of the upstream and downstream contact portions Pa and Pb includes a plurality of (in this case, eight) protrusions in series, each evenly spaced from each other in the axial direction X while aligned with a corresponding one of the protrusions on the other side of the fuser pad 26. Compared to providing each contact portion in a single, elongated continuous shape, provision of the series of mutually spaced protrusions results in a reduced area of contact between the fuser pad 26 and the reinforcing member 23, leading to higher thermal efficiency in the fuser assembly.

Although in the present embodiment, the fuser pad 26 is depicted as including two series of mutually spaced protrusions to contact the reinforcing member 23, the contact portions P may be configured otherwise than those depicted herein. For example, instead of a flat contact surface, the contact portion P may define a linear contact edge or a pointed contact end to establish line or point contact (or any such similar contact) with the bearing surface 23b of the reinforcing member 23. Further, the number of contact portions P is not limited to two, and three or more contact portions P spaced apart from each other in the conveyance direction Y may be provided depending on specific applications.

With still continued reference to FIG. 4, the stationary fuser pad 26 is shown being symmetrical in cross section with respect to an imaginary plane Q perpendicular to the conveyance direction Y and passing through a center of the fuser pad 26 in the conveyance direction Y, as indicated by a broken line in FIG. 4.

Symmetrical configuration of the fuser pad 26 allows for increased balance and stability in position of the fuser pad 26, leading to higher protection against displacement of the fuser pad 26 and concomitant adverse effects on fixing and media conveyance performance of the fixing device.

Further, in the conveyance direction Y, the contact portions P of the fuser pad 26 are dimensioned with respect to the adjacent structure of the fuser assembly to satisfy the following inequality:

$$LA < LB < LC \qquad \text{Equation I}$$

where "LA" indicates a length or distance between two furthest edges of the fixing nip N in the conveyance direction Y, "LB" indicates a length or distance between two furthest edges of the upstream and downstream contact portions Pa and Pb in the conveyance direction Y, and "LC" indicates a length or distance between two furthest edges of the bearing surface 23b in the conveyance direction Y.

Furthermore, in the conveyance direction Y, the two furthest edges of the fixing nip N both exist between the two furthest edges of the contact portions Pa and Pb, both of which in turn exist between the two furthest edges of the bearing surface 23b of the reinforcing member 23. Thus, in the conveyance direction Y, the dimension of the fixing nip N is encompassed by that of the multiple, mutually spaced contact portions P, which is in turn covered by the dimension of the bearing surface 23b of the reinforcing member 23.

Such dimensioning of the contact portions P with respect to the adjacent structure of the fuser assembly allows for increased balance and stability in position of the fuser pad 26, leading to higher protection against displacement of the fuser pad 26 and concomitant adverse effects on fixing and media conveyance performance of the fixing device.

Figure 8:
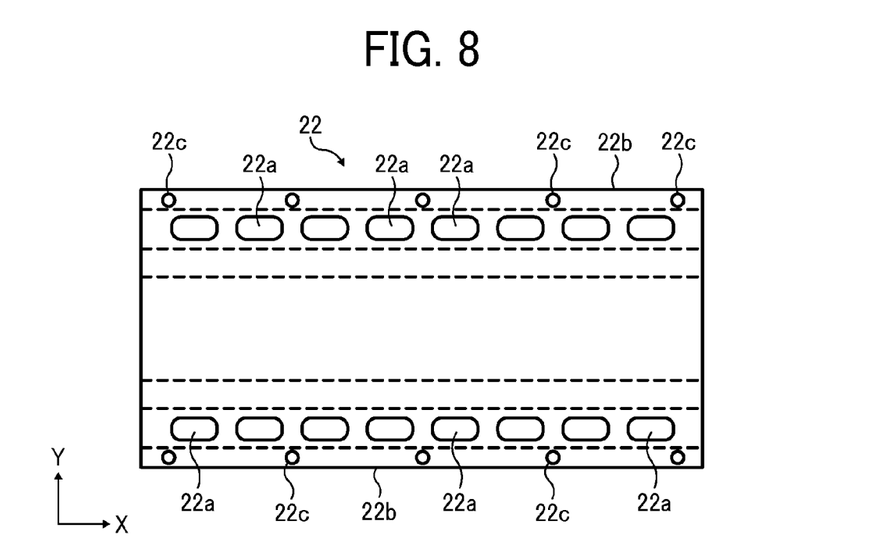
FIG. 8 is a plan view of a low-friction sheet in its unfolded, disassembled state before assembly into the fixing device of FIG. 2.

FIG. 8 is a plan view of the low-friction sheet 22 in its unfolded, disassembled state before assembly into the fixing device 20 of FIG. 2.

As shown in FIG. 8, in the present embodiment, the first sheet 22 comprises a generally rectangular piece extending in the axial direction X, which has a pair of opposed, longitudinal edges 22b thereof overlapping each other as the first sheet 22 wraps around the stationary pad 26. The first sheet 22 has one or more (e.g., in this case, five) pairs of screw holes 22c defined in the pair of opposed, longitudinal edges 22b thereof, each paired screw holes being aligned with each other upon wrapping of the first sheet 22 around the stationary pad 26.

Also, as mentioned earlier, one or more perforations 22a are defined in the first sheet 22 through which the contact portions P are inserted to allow close fitting between the low-friction sheet 22 and the stationary fuser pad 26 except at the contact portions P. For example, two series of eight oval perforations 22a may be provided, each perforation adapted to accommodate a single protrusion included in the pair of contact portions Pa and Pb of the fuser pad 26.

Figure 9:
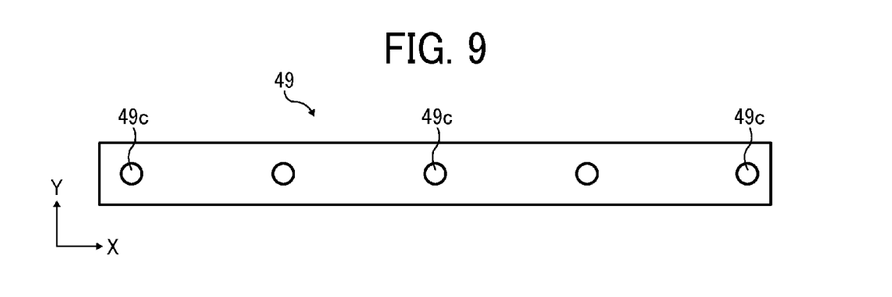
FIG. 9 is a plan view of a supplementary sheet in its disassembled state before assembly into the fixing device 20 of FIG. 2.

FIG. 9 is a plan view of the supplementary sheet 49 in its disassembled state before assembly into the fixing device 20 of FIG. 2.

As shown in FIG. 9, in the present embodiment, the second sheet 49 comprises a generally rectangular piece extending in the axial direction X and narrower than the first sheet in the conveyance direction Y, which is positioned over and along the overlapping edges 22b of the first sheet 22. The second sheet 49 has one or more (e.g., in this case, five) screw holes 49c defined therein, each being aligned with one pair of screw holes 22c in the first sheet 22 upon positioning of the second sheet 49 on the first sheet 22.

Figure 10:
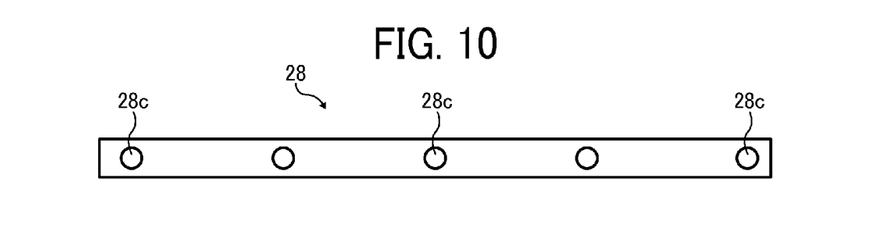
FIG. 10 is a plan view of a securing plate before assembly into the fixing device of FIG. 2.

FIG. 10 is a plan view of the securing plate 28 before assembly into the fixing device 20 of FIG. 2.

As shown in FIG. 10, in the present embodiment, the securing plate 28 is a flat, elongated piece of suitable material having a length comparable to that of the fuser pad 26. The securing plate 28 has one or more (e.g., in this case, five) screw holes 28c defined therein to allow insertion of screws 24 therethrough.

Figure 11A:
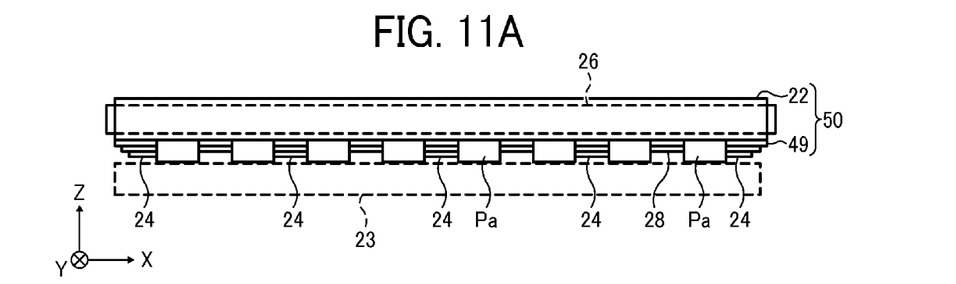
FIGS. 11A and 11B are side-elevation and plan views, respectively, of the stationary fuser pad assembled together with the lubrication mechanism and the securing plate.
Figure 11B:
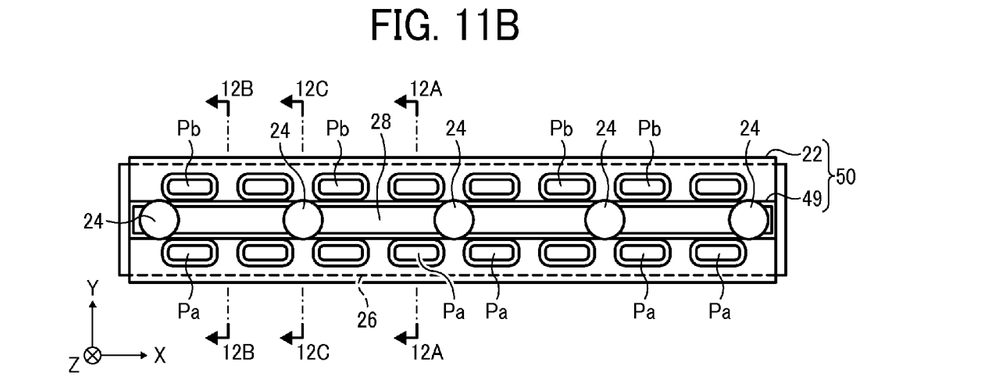

FIGS. 11A and 11B are side-elevation and plan views, respectively, of the stationary fuser pad, 26 assembled together with the lubrication mechanism 50 and the securing plate 28.

As shown in FIGS. 11A and 11B, in the present embodiment, one or more (e.g., in this case, five) screws 24 are provided for fastening the lubrication mechanism 50 onto the stationary pad 26, each screw 24 evenly spaced apart from each other in the axial direction X of the fuser pad 26. To accommodate these screws 24, the same number of screw holes may be provided at corresponding locations along each of the longitudinal edge 22b of the low-friction sheet 22, the supplementary sheet 49, and the securing plate 28. Also, the same number of female threads 26c may be provided in the fuser pad 26, each adapted for engagement with a threaded end of the screw 24 (see FIG. 7B, for example).

Upon assembly, each of the one or more screws 24 passes through the aligned screw holes of the first and second sheets 22 and 49 into the stationary pad 26 to fasten the first and second sheets 22 and 49 together onto the stationary pad 26. The securing plate 28 is disposed on the supplementary sheet 49 over the overlapping edges 22b of the low-friction sheet 22, and screwed onto the fuser pad 26 together with the sheets 22 and 49 to secure the sheets 22 and 49 in place on the fuser pad 26.

The fuser pad 26, the low-friction sheet 22, the supplementary sheet 49, the securing plate 28, and the screws 24 are thus combined together to form a single, integrated subassembly module for mounting to the fixing device 20.

Figure 12A:
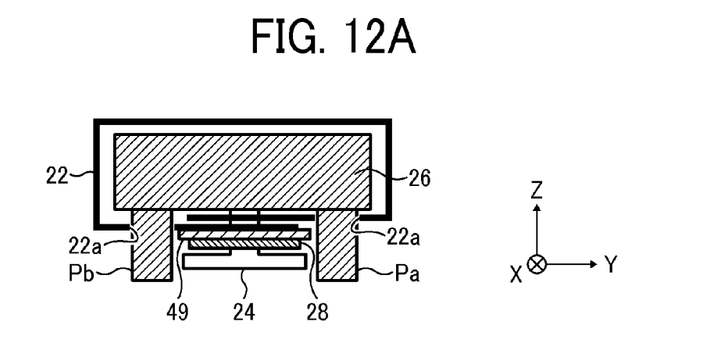
FIGS. 12A through 12C are cross-sectional views along lines 12A-12A, 12B-12B, and 12C-12C, respectively, of FIG. 11B.
Figure 12B:
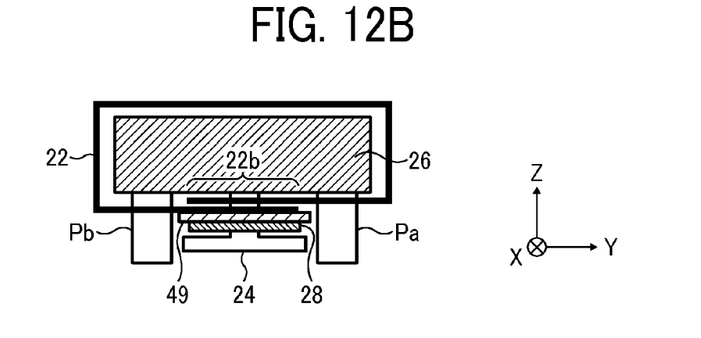
Figure 12C:
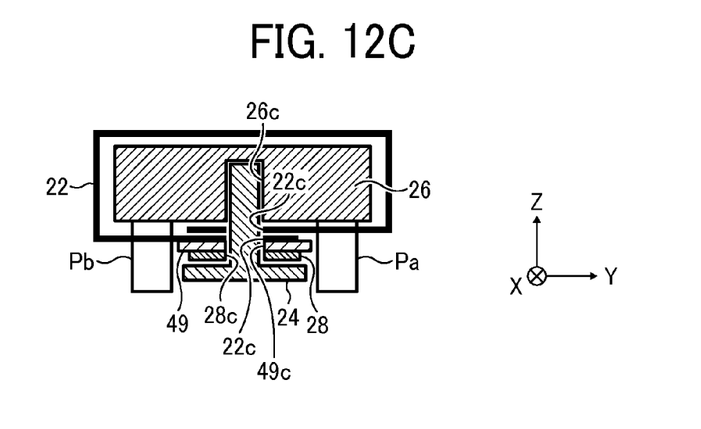

FIGS. 12A through 12C are cross-sectional views along lines 12A-12A, 12B-12B, and 12C-12C, respectively, of FIG. 11B.

As shown in FIGS. 12A through 12C, in the fuser assembly, the low-friction sheet 22 wraps around the fuser pad 26 except for the contact portions Pa and Pb protruding through the perforations 22a defined in the sheet 22 (FIG. 12A).

The pair of opposed longitudinal edges 22b of the low-friction sheet 22 overlaps each other at a position between the upstream and downstream contact portions Pa and Pb, with the securing plate 28 disposed on the supplementary sheet 49 over the overlapping edges 22b of the sheet 22 (FIG. 12B).

The screw 24 is inserted through the screw hole 28c of the securing plate 28, the screw hole 49c of the supplementary sheet 49, and the paired screw holes 22c of the low-friction sheet 22, to engage the female thread 26c defined in the fuser pad 26 (FIG. 12C). For preventing interference between the screw 24 and the reinforcing member 23, the screw head is suitably sized or positioned so as not to protrude beyond the contact portions P in the load direction Z.

Thus, the low-friction sheet 22 has its opposed longitudinal edges 22b, one directed upstream and the other downstream in the conveyance direction Y, both fastened onto the fuser pad 26 with the screws 24. Such arrangement effectively protects the sheet 22 against displacement or separation from the fuser pad 26 as well as creasing and other deformation from its proper configuration due to frictional contact with the fuser belt 21, which would otherwise occur, for example, where the fuser belt 21 moves from upstream to downstream in the rotational direction C during normal operation of the fixing device 20, or where the fuser belt 21 moves from downstream to upstream in the rotational direction C as the fuser member and/or the pressure member are manually rotated during maintenance or repair, such as removal of a paper jam, of the fixing device 20.

Moreover, using the evenly spaced screws 24 in combination with the securing plate 28 disposed on the overlapping edges of the sheet 22 can fasten the low-friction sheet 22 onto the fuser pad 26 more stably and firmly than other types of fastening mechanism, such as bonding the overlapping edges together using adhesive, or hooking the overlapping edges onto the contact portions.

Further, securing the first and second sheets 22 and 49 together with the securing plate 28 allows for close contact between the first and second sheets 22 and 49, which ensures the supplementary sheet 49 properly replenishes the low-friction sheet 22 with lubricant as required.

Still further, perforating the low-friction sheet 22 for accommodating the contact portions P while positioning the screws 24, the supplementary sheet 49, and the securing plate 28 between the contact portions P allows for a compact overall size of the fuser assembly.

Still further, integrability of the fuser pad 26 together with the lubrication mechanism 50 and the associated fastener and securing mechanism into an integrated subassembly module allows for good controllability and efficient assembly, particularly of the lubrication mechanism 50 with a balanced distribution of lubricant between the first and second sheets 22 and 49, during manufacture and maintenance of the fixing device 20.

Furthermore, evenly spacing the series of protrusions constituting the contact portion P of the fuser pad 26 translates into even distribution of forces acting on the perforations 22a of the low-friction sheet 22, which prevents the sheet 22 from damage due to concentrated stress as the sheet 22 slides against adjoining surfaces during operation.

Hence, the fixing device 20 according to this patent specification incorporates an endless belt assembly including an endless flexible belt 21 looped into a generally cylindrical configuration extending in an axial direction X thereof for rotation in a rotational, circumferential direction C thereof; a stationary pad 26 stationarily disposed inside the loop of the belt 21 to support pressure applied via the belt 21; a first sheet 22 of lubricant-impregnated material wrapping around the stationary pad 26 to supply lubricant between the stationary pad 26 and the belt 21; and a second sheet 49 of lubricant-impregnated material contacting the first sheet 22 to replenish the first sheet 22 with a new supply of lubricant.

Owing to incorporation of the endless belt assembly, the fixing device 20 can provide a fast, reliable fixing process that can operate with short warm-up time and first-print time without causing image defects even at high processing speeds. In particular, combined use of the first, low-friction sheet 22 with the second, supplementary sheet 49 allows an effective, durable, long-lasting lubricating capability that maintains the frictional resistance between the pad and belt surfaces sufficiently low over an extended period of time.

Although a particular configuration has been illustrated, the fixing device 20 may be configured otherwise than that depicted primarily with reference to FIG. 2, with appropriate modifications to the material, number, size, shape, position, and other features of components included in the fixing device 20. In each of those alternative embodiments, various beneficial effects may be obtained due to provision of the lubrication mechanism 50 and other aspects of the fixing device 20 according to this patent specification.

Some such embodiments are depicted below with reference to FIGS. 13 and 14, in which the configuration of the lubrication sheet is different from those depicted in the foregoing embodiments.

Figures 13, 14:
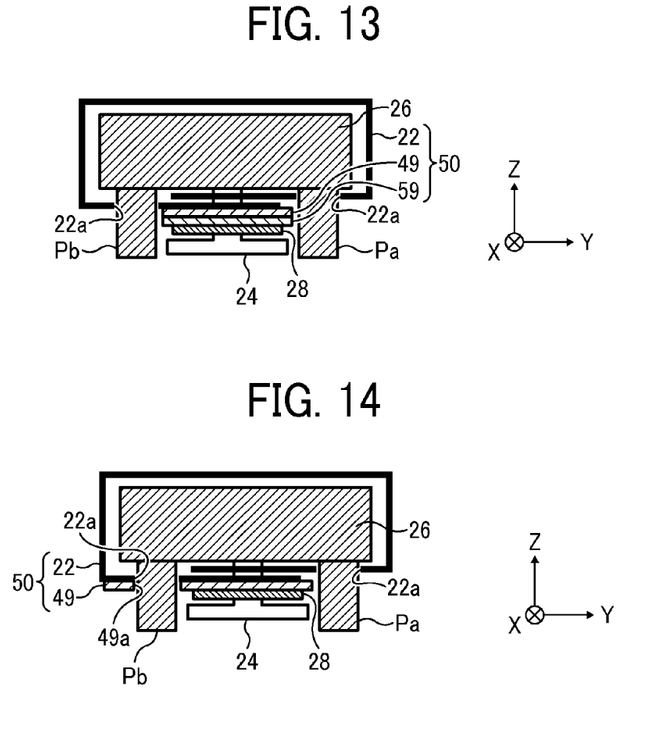
FIG. 13 is a cross-sectional view of the stationary fuser pad assembled together with the lubrication mechanism and the securing plate according to further embodiment of this patent specification.
FIG. 14 is a cross-sectional view of the stationary fuser pad assembled together with the lubrication mechanism and the securing plate according to still further embodiment of this patent specification.

FIG. 13 is a cross-sectional view of the stationary fuser pad 26 assembled together with the lubrication mechanism 50 and the securing plate 28 according to further embodiment of this patent specification.

As shown in FIG. 13, in addition to the first and second sheets 22 and 49, the lubrication mechanism 50 in the present embodiment includes one or more third, supplementary sheets 59 of lubricant-impregnated material superimposed on the second sheet 49. The second and third sheets 49 and 59 may be identical to each other in terms of sheet material, sheet thickness, and type of lubricant with which the sheet is impregnated.

During operation, the low-friction sheet 22 retains a constant, continuous supply of lubricant between the adjoining surfaces of the fuser pad 26 and the fuser belt 21. As the first sheet 22 gradually releases lubricant to the inner circumferential surface of the belt 22 or elsewhere around the fuser assembly, a new supply of lubricant flows from the second sheet 49 to the first sheet 22, as well as from the third sheet 59 to the second sheet 49, which eventually replenishes the first sheet 22.

As is the case with the foregoing embodiments, combined use of the low-friction sheet 22 with the multiple, superimposed supplementary sheets 49 and 59 allows a more effective, durable, long-lasting lubricating capability that maintains the frictional resistance between the pad and belt surfaces sufficiently low over a longer period of time than is otherwise possible in the fixing device 20.

FIG. 14 is a cross-sectional view of the stationary fuser pad 26 assembled together with the lubrication mechanism 50 and the securing plate 28 according to still further embodiment of this patent specification.

As shown in FIG. 14, the second sheet 49 in the present embodiment extends beyond the contact portions P, having at least one perforation 49a defined therein in alignment with the perforation 22a of the first sheet 22, through which the contact portions P are inserted such that the second sheet 49 contacts the first sheet 22 between and around the contact portions P. Multiple such perforations 49a may be provided to accommodate multiple contact portions P, for example, both the upstream and down stream contact portions Pa and Pb, instead of only one of the two.

The securing plate 28 is disposed on the supplementary sheet 49 over the overlapping edges 22b of the low-friction sheet 22, and screwed onto the fuser pad 26 together with the sheets 22 and 49 to secure the sheets 22 and 49 in place on the fuser pad 26.

As is the case with the foregoing embodiments, combined use of the low-friction sheet 22 with the supplementary sheet 49 allows an effective, durable, long-lasting lubricating capability that maintains the frictional resistance between the pad and belt surfaces sufficiently low over a longer period of time than is otherwise possible in the fixing device 20.

In further embodiment, instead of a multilayered belt, the endless, flexible fuser belt 21 may be configured as a thin film of material, such as polyimide, polyamide, fluorine rubber, metal, or the like, formed into an endless looped configuration.

In still further embodiment, instead of a radiant heater disposed inside the loop of the belt 21 to radiate heat to the belt 21, the heater 25 may be configured as an electromagnetic induction heater disposed outside the loop of the belt to heat the belt through electromagnetic induction.

Figure 15:
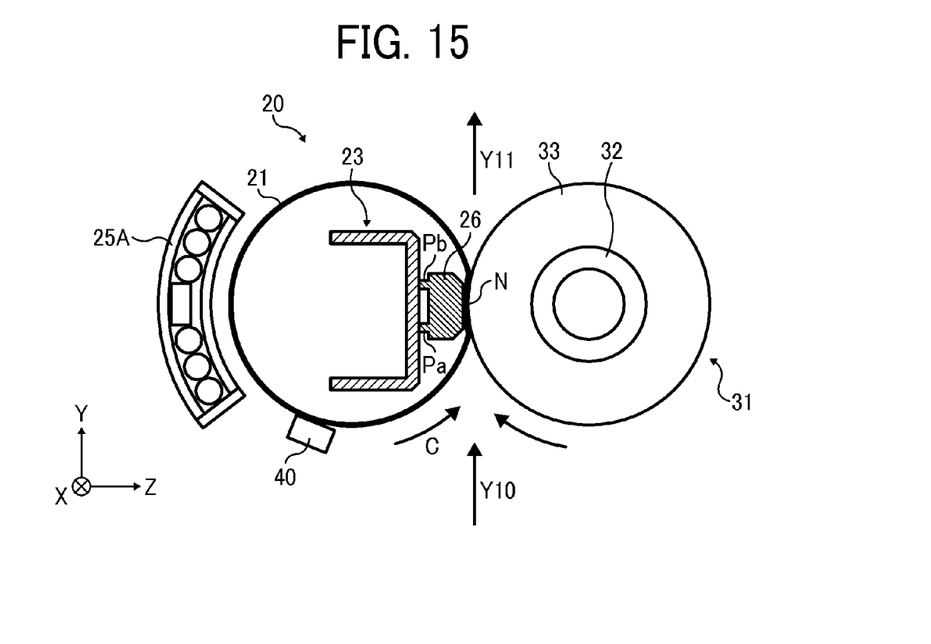
FIG. 15 is an axial cross-sectional view of the fixing device according to another embodiment of this patent specification.

FIG. 15 is an axial cross-sectional view of the fixing device 20 according to another embodiment of this patent specification.

As shown in FIG. 15, the overall configuration of the present embodiment is similar to that depicted primarily with reference to FIG. 2, including an endless flexible belt 21 looped into a generally cylindrical configuration extending in an axial direction X thereof for rotation in a rotational, circumferential direction C thereof; a stationary fuser pad 26 stationarily disposed inside the loop of the belt 21; a rotary pressure member 31 disposed parallel to the belt 21; and a reinforcing member 23 stationarily disposed in contact with the stationary pad 26 inside the loop of the belt 21 for reinforcing the fuser pad 26, with the fuser pad 26 including two or more contact portions Pa and Pb spaced apart from each other in the conveyance direction Y, each generally extending in the axial direction X of the looped belt 21 and protruding toward the reinforcing member 23 to contact the reinforcing member 23.

Unlike the foregoing embodiment, the fixing device 20 in the present embodiment employs an induction heater 25A disposed outside the loop of the belt 21 to heat the belt 21 through electromagnetic induction.

Specifically, the induction heater 25A includes an electromagnetic inductor that consists of a set of electromagnetic coils or Litz wires each being a bundle of thinner wires extending across a portion of the fuser belt 21 in the axial direction X. A semi-cylindrical main core formed of a ferromagnetic material with a high magnetic permeability ranging from approximately 1,000 to approximately 3,000 is disposed parallel with the electromagnetic coils. Optionally, auxiliary central and/or side cores may be provided for efficient formation of magnetic flux. These components of the heater 25A are supported together by a guide member formed of heat resistant resin or the like. For efficient heating of the fuser belt 21 through electromagnetic induction, the electromagnetic inductor may be positioned surrounding the entire circumference of the fuser belt 21.

In addition, a heating element is provided in the fuser belt 21 to produce heat by electromagnetic induction. For example, a heat generation layer, formed of suitable metal, including, but not limited to, nickel, stainless steel, iron, copper, cobalt, chromium, aluminum, gold, platinum, silver, tin, palladium, and alloys containing one or more of these metals, is disposed in addition to, or in place of, the multiple layers of the belt 21. Thus, an additional heat generation layer may be deposited between the elastic layer and the release coating of the belt 21. Alternatively, a heat generation layer itself may constitute a substrate of the belt 21.

During operation, the induction heater 25A generates an alternating magnetic field around the fuser belt 21 as a high-frequency alternating current passes through the electromagnetic coils. The changing magnetic field induces eddy currents over the heat generation layer of the fuser belt 21, which exhibits certain electrical resistivity to produce a corresponding amount of Joule heat from within the belt 21. Heat thus generated through electromagnetic induction is distributed throughout the length of the fuser belt 21, which heats the fixing nip N to a desired processing temperature.

In yet still further embodiment, the heater 25 may be configured as a planar resistance heater extending along and in contact with the belt in the circumferential direction thereof to generate heat for conduction to the belt.

Specifically, such a planar resistance heater may be a ceramic heater that has a resistive heating element embedded in a planar plate in contact with an outer or inner circumferential surface of the belt 21. The planar heater may cover the belt circumference either partially or entirely. Two ends of the resistive heating element are connected to a power supply from which an electric current is supplied to the resistive heating element, which in turn generates heat for conduction to the fuser belt 21 in contact with the planar plate.

Numerous additional modifications and variations are possible in light of the above teachings. It is therefore to be understood that, within the scope of the appended claims, the disclosure of this patent specification may be practiced otherwise than as specifically described herein.

What is claimed is:

1. A fixing device comprising:
   an endless flexible belt extending in an axial direction thereof for rotation in a rotational, circumferential direction thereof;
   a stationary pad stationarily disposed inside the loop of the belt;
   a rotary pressure member disposed parallel to the belt,
   the rotary pressure member pressing against the stationary pad via the belt to form a nip therebetween, through which a recording medium is conveyed in a conveyance direction; and
   a lubrication mechanism to supply lubricant between the stationary pad and the belt, the mechanism including:
      a first sheet of lubricant-impregnated material surrounding the stationary pad to intervene between the stationary pad and the belt across the nip; and
      a second sheet of lubricant-impregnated material disposed in surface contact with the first sheet at a position outside the nip, wherein the first and second sheets are identical to each other in terms of sheet material, sheet thickness, and type of lubricant with which the sheet is impregnated.

2. A fixing device comprising:
   an endless flexible belt extending in an axial direction thereof for rotation in a rotational, circumferential direction thereof;
   a stationary pad stationarily disposed inside the loop of the belt;
   a rotary pressure member disposed parallel to the belt,
   the rotary pressure member pressing against the stationary pad via the belt to form a nip therebetween, through which a recording medium is conveyed in a conveyance direction; and
   a lubrication mechanism to supply lubricant between the stationary pad and the belt, the mechanism including:
      a first sheet of lubricant-impregnated material surrounding the stationary pad to intervene between the stationary pad and the belt across the nip; and
      a second sheet of lubricant-impregnated material disposed in surface contact with the first sheet at a position outside the nip, wherein the material of the first and second sheets includes a web of fluorine resin.

3. The fixing device according to claim 1, wherein the thickness of the first and second sheets falls in a range from 150 μm to 500 μm.

4. The fixing device according to claim 1, wherein the first and second sheets are both impregnated with a lubricating agent that exhibits a kinematic viscosity ranging from 50 to 1,000 centistokes.

5. The fixing device according to claim 1, wherein the first sheet wraps around the stationary pad.

6. The fixing device according to claim 5, further comprising a reinforcing member stationarily disposed in contact with the stationary pad inside the loop of the belt for reinforcing the stationary pad,
   wherein the stationary pad includes one or more contact portions spaced apart from each other in the conveyance direction, each extending in the axial direction of the belt and protruding toward the reinforcing member to contact the reinforcing member,
   the first sheet has at least one perforation defined therein through which the contact portions are inserted to allow close fitting between the first sheet and the stationary pad except at the contact portions, and
   the second sheet is disposed between the contact portions of the stationary pad to establish surface contact with the first sheet.

7. The fixing device according to claim 6, wherein the second sheet has at least one perforation defined therein in alignment with the perforation of the first sheet, through which the contact portions are inserted such that the second sheet contacts the first sheet between and around the contact portions.

8. The fixing device according to claim 5, wherein the first sheet extends in the axial direction, which has a pair of opposed, longitudinal edges thereof overlapping each other as the first sheet wraps around the stationary pad, and
   the second sheet extends in the axial direction and narrower than the first sheet in the conveyance direction, which is positioned over and along the overlapping edges of the first sheet.

9. The fixing device according to claim 6, further comprising one or more screws for fastening the lubrication mechanism onto the stationary pad,
   wherein the first sheet has one or more pairs of screw holes defined in the pair of opposed, longitudinal edges thereof, each paired screw holes being aligned with each other upon wrapping of the first sheet around the stationary pad, the second sheet has one or more screw holes defined therein, each being aligned with one pair of screw holes in the first sheet upon positioning of the second sheet on the first sheet, and each of the one or more screws passes through the aligned screw holes of the first and second sheets into the stationary pad to fasten the first and second sheets together onto the stationary pad.

10. The fixing device according to claim 9, further comprising a securing plate disposed where the lubrication mechanism is screwed to secure the lubrication mechanism in place on the stationary pad.

11. The fixing device according to claim 1, wherein the lubrication mechanism includes one or more third sheets of lubricant-impregnated material disposed in contact with the second sheet.

12. The fixing device according to claim 1, wherein second and third sheets are identical to each other in terms of material, thickness, and type of lubricant with which the sheet is impregnated.

13. The fixing device according to claim 1, further comprising a pair of retaining flanges, one connected to an axial end of the leaped-belt, to retain the belt in the substantially cylindrical configuration thereof.

14. The fixing device according to claim 1, further comprising a radiant heater disposed inside the loop of the belt to radiate heat to the belt.

15. The fixing device according to claim 1, further comprising an electromagnetic induction heater disposed outside the loop of the belt to heat the belt through electromagnetic induction.

16. The fixing device according to claim 1, further comprising a planar resistance heater extending along and in contact with the belt in the circumferential direction thereof to generate heat for conduction to the belt.

17. An image forming apparatus incorporating the fixing device according to claim 1.

18. The fixing device according to claim 1, wherein the second sheet is affixed in a recess in the stationary pad.

* * * * *